(No Model.)  7 Sheets—Sheet 1.

T. BRINING.
MACHINE FOR RIVETING BOOTS OR SHOES.

No. 409,347. Patented Aug. 20, 1889.

(No Model.) 7 Sheets—Sheet 5.

T. BRINING.
MACHINE FOR RIVETING BOOTS OR SHOES.

No. 409,347. Patented Aug. 20, 1889.

(No Model.) 7 Sheets—Sheet 6.
T. BRINING.
MACHINE FOR RIVETING BOOTS OR SHOES.

No. 409,347. Patented Aug. 20, 1889.

(No Model.) 7 Sheets—Sheet 7.

T. BRINING.
MACHINE FOR RIVETING BOOTS OR SHOES.

No. 409,347. Patented Aug. 20, 1889.

Witnesses
H. C. Newman.
Louis G. Julihn.

Inventor
Thomas Brining
By his Attorneys
Baldwin, Davidson & Wight.

ously supplying the riv-# UNITED STATES PATENT OFFICE.

THOMAS BRINING, OF LEEDS, COUNTY OF YORK, ASSIGNOR OF ONE-HALF TO GEORGE LISTER, OF HEADINGLY, LEEDS, ENGLAND.

MACHINE FOR RIVETING BOOTS OR SHOES.

SPECIFICATION forming part of Letters Patent No. 409,347, dated August 20, 1889.

Application filed February 13, 1889. Serial No. 299,793. (No model.) Patented in England October 4, 1887, No. 13,390.

*To all whom it may concern:*

Be it known that I, THOMAS BRINING, a subject of the Queen of Great Britain and Ireland, residing at Leeds, in the county of York, England, have invented new and useful Improvements in Machines for Riveting Boots or Shoes, (for which I have obtained a patent in Great Britain, No. 13,390, bearing date October 4, 1887,) of which the following is a specification.

My invention relates to improvements in riveting-machines such as are used in the manufacture of boots and shoes; and the objects of these improvements are, first, to provide simple and effective mechanism for arranging and automatically supplying the rivets to the fixing or setting tool; second, to afford facilities for regulating the pitch or distance between each rivet, as well as from the edge of the sole; and, third, to enable the operator to change the size of the rivets without stopping the machine. I attain these objects by mechanism illustrated in the accompanying drawings, in which—

Fig. 24, a front elevation; Fig. 25, a back elevation; Fig. 28, an enlarged part elevation of a detail.

Like parts are marked with similar letters of reference in all the views.

The standard A, horizontal bearings $a\ a'\ a^2\ a^3$, (which latter are fixed on bracket $a^4$,) and adjustable bifurcated bracket $a^5$ constitute the frame-work of the machine. The standard A may, when preferred, be shortened and adapted for fixing to a table or bench. In the bearings $a\ a'$ rotates a shaft A', on which is mounted the friction driving-pulley B and cams C and D. To the front of the standard is fixed a fender or bracket E, to which the rivet setting mechanism is attached, while to each side of the standard are fixed the brackets F F, for carrying the self-feeding mechanism, as hereinafter described.

Figure 3:
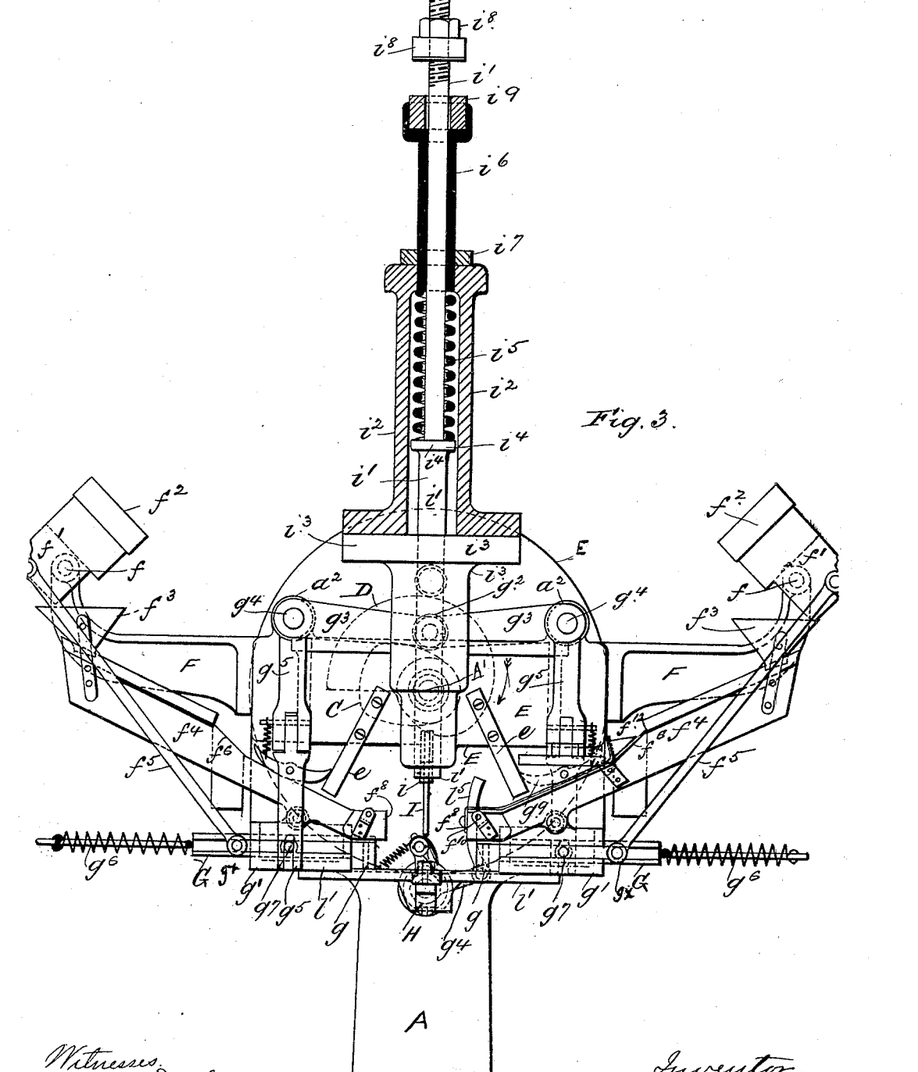
Fig. 3, an enlarged part front elevation.

In order to adapt the machine for attaching the soles to uppers of boots or shoes requiring a different-sized rivet, as well as to prevent the machine from standing while such rivets were being changed or the box refilled, two sets of self-feeding mechanism are shown at Fig. 3, each of which is capable of being thrown in or out of action at pleasure, so that when one is at work the other is stationary, and, with the exception of being arranged for fixing to the right and left hand of the machine, they are duplicates of each other. I have therefore marked each with the same letters of reference.

Figures 1, 21, 22, 23:
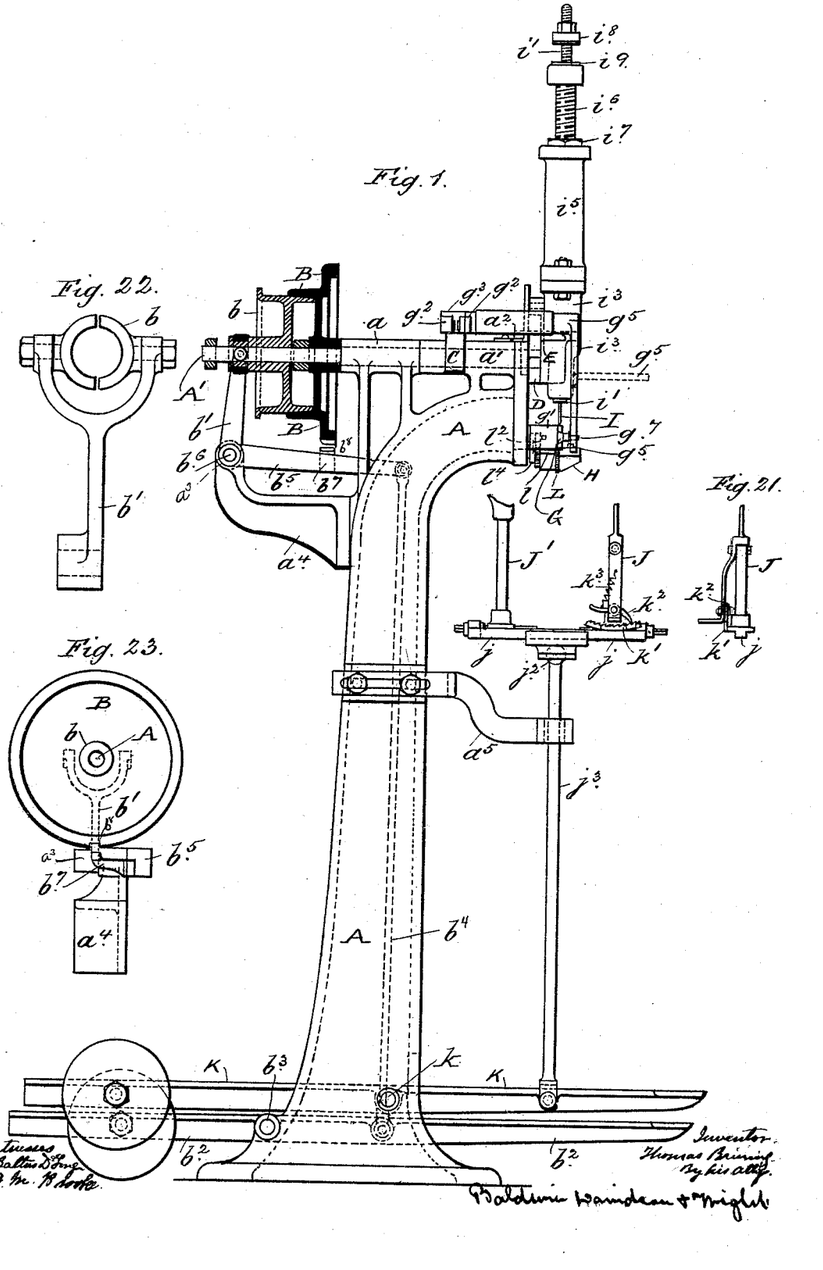
Figure 1 is a part side elevation.
Fig. 21, an end elevation of adjustable support for last.
Figs. 22 and 23, details of parts of machine.
Figures 2, 13, 14, 15, 16, 17:
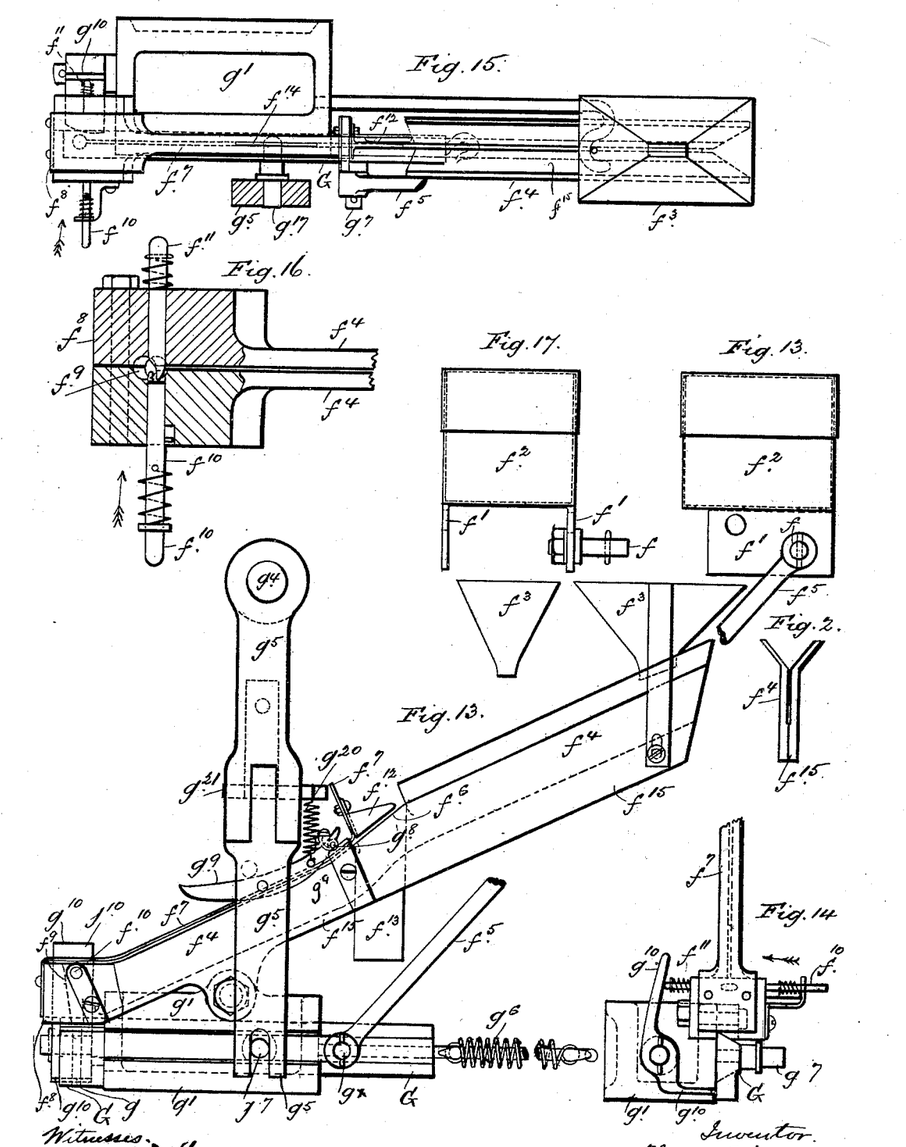
Fig. 2, an end elevation of guide-chute.
Figs. 13, 14, 15, and 17 are respectively a front elevation, end elevation, part plan, and side elevation of the mechanism for supplying the rivets to the fixing-tool.
Fig. 16, an enlarged plan of device for regulating the supply of rivets.

To each bracket F is fixed a pin $f$, on which is pivoted or fulcrumed, preferably out of center, as shown, a framing, $f'$, carrying a rectangular box $f^2$, (with or without a hinged spring-lid,) in which the rivets are placed prior to being fed to the setting-tool. In the bottom of the box, at or near the end nearest to the setting-tool, is a slit or aperture, through which the rivets escape into the hopper $f^3$, and from thence to a conducting spout or chute. To the box an intermitting radial reciprocating or oscillating motion is imparted from a slide (to be hereinafter described) through rod $f^5$, for the purpose of arranging and permitting the rivets to pass through the aperture in the box. The chute $f^4$, beneath the intermediate hopper $f^3$, is placed at such an angle that the rivets will by their own weight gravitate down the channel to the enlarged end thereof. The chute is preferably made in two pieces, and on the inner side of such pieces is provided a facing $f^{15}$, of the shape shown by dotted lines at Figs. 13 and 2, and of a greater thickness than the diameter of the largest rivet to be used, thereby forming a slit or channel in the chute of less width than the heads of the rivets. In order to allow the rivets to get into the required vertical position for passing down the channel after they escape from the intermitting hopper $f^3$, the chute is made hopper-shaped for a portion of its length until it reaches the incline $f^{15}$. Below the latter the channel in the chute is protected by a suitable cover $f^7$, placed a little distance—say about a sixteenth of an inch—above the upper face of the chute. The rivets after passing down the second or covered portion of the chute are conducted into the enlarged end $f^8$, but are prevented from passing into the hole $f^9$, immediately over the feed-slide G, by means of the spring pin device. This spring pin device consists of the pins $f^{10}$ and $f^{11}$, (each encircled by a spiral spring,) and are so arranged that only one rivet can escape into the hole $f^9$ at a time. This is accomplished by shaping or forming the pins as shown at Fig. 16 and arranging the end of pin $f^{10}$ to be kept in contact with that of pin $f^{11}$ by means of a bell-cranked lever $g^{10}$, pivoted to block $g'$, and by curving or shaping the front portion (or part nearest to the channel) of pin $f^{10}$ sufficient room is provided for the head of a rivet to pass into the hole $f^9$ whenever the pins are pressed by the spiral springs in the direction shown by arrow; but when the channel is filled to the incline $f^6$ then the projecting V-shaped tongue-piece $f^{12}$ (which is placed on the incline $f^6$) is employed to catch the rivets as they escape from the first or hopper-shaped portion of the chute and direct them over the side of the incline into a box or suitable receptacle $f^{13}$, provided therefor. The rivets after passing through the hole $f^9$ enter a hole $g$ in the end of the feeding-slide G. This slide is carried horizontally in dovetail or other suitable bearings formed on or fixed to the block $g'$, (to which the chute is also fixed at one end,) secured or otherwise attached to the standard A. The slide G has an intermittent reciprocating motion imparted to it from the cam C on driving-shaft A' through runner $g^2$, lever $g^3$, shaft $g^4$, (carried in bearings $a^2$,) jointed bifurcated lever $g^5$, and pin $g^7$.

Figure 24:
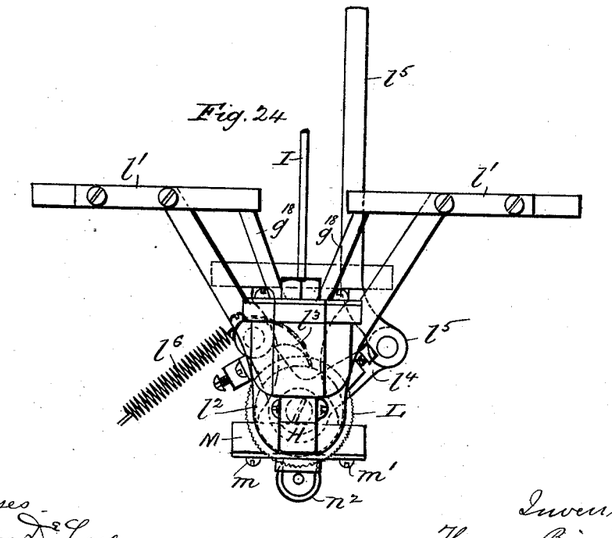
Figures 25, 28:
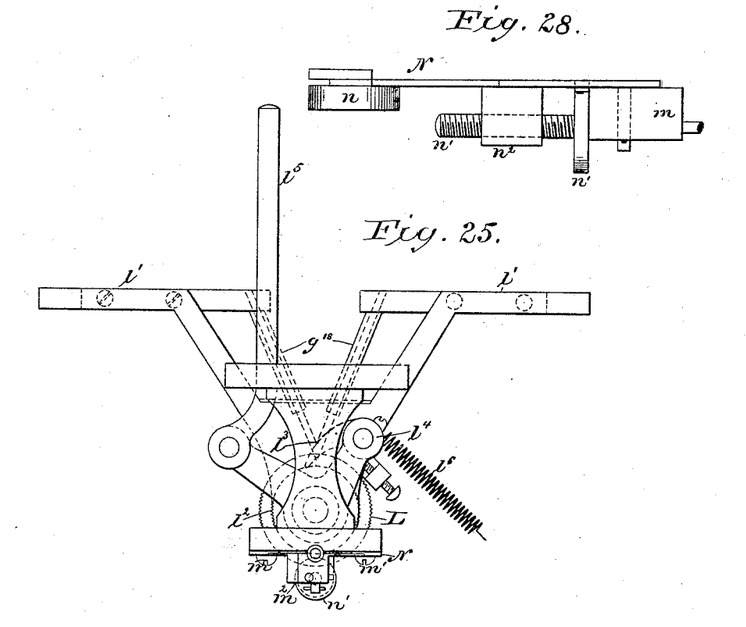
Figure 26:
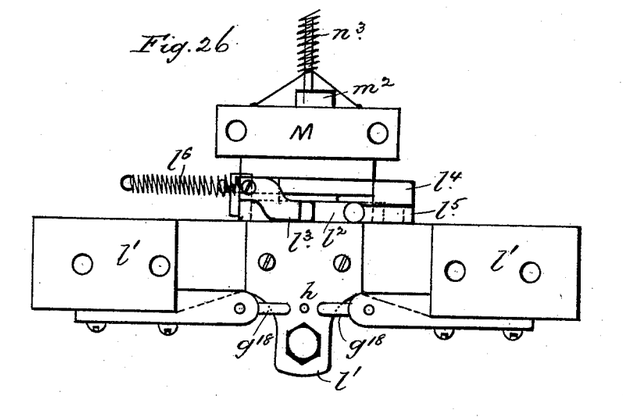
Fig. 26, a plan looking at the top, and Fig. 27 a plan looking at the under side, of arrangement for regulating the distance of the rivets from the edge of the sole.
Figure 27:
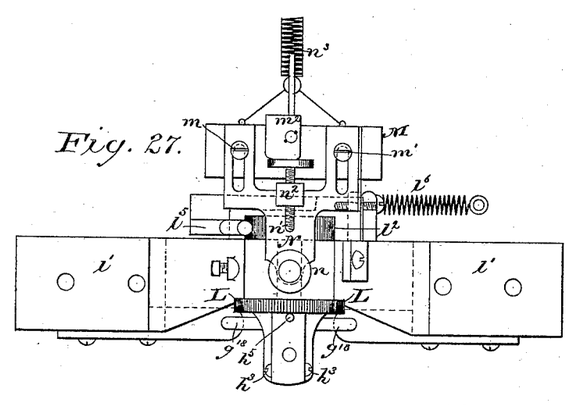

In the drawings I have shown the slide in its normal position ready to receive the rivet, and when the cam C raises the runner $g^2$ and lever $g^3$ the jointed lever $g^5$ is caused to move inward and carries with it the slide G (containing a rivet in the hole $g$) until the latter is over the die-box in a position to deposit the rivet therein; or, when preferred, the traverse of the slides G may be shortened and the rivets deposited into a tube or pipe $g^{18}$ (shown at Figs. 24 and 27) and by it conducted into the die-box. As the runner passes off the cam the spiral spring $g^6$ returns the slide to its original position. At the same time that the slide G is moved inward the rectangular box $f^2$ is oscillated (by means of the rod $f^5$, one end of which is connected to the slide at $g^x$, while the other end is attached to the framing $f'$, carrying the box) and the spring-pin $f^{10}$ is moved inward, which permits of a rivet to escape from the channel into the hole $f^9$, ready to drop into hole $g$ on the return of the slide. The pins $f^{10}$ and $f^{11}$ are kept in position shown in drawings by means of the herein-described bell-crank lever $g^{10}$; but as soon as the lower horizontal portion of the lever is clear of the forward enlarged end of the slide G the spiral springs expand, and thus force the vertical portion of the lever outward, carrying with them the pins in direction shown by arrow until the cut-away portion is in a position to allow a rivet to pass into the hole $f^9$. The lever $g^5$ is jointed, so that it can be readily thrown out of gear with the slide.

Figures 4, 5, 6, 8, 9, 10, 11, 12:
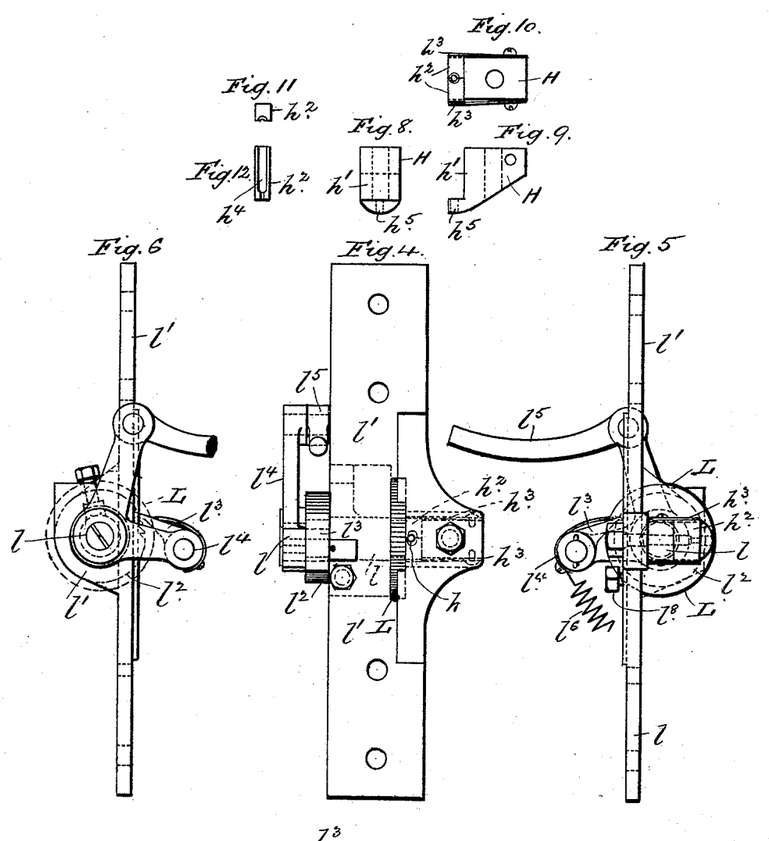
Figs. 4, 5, 6, and 7 are respectively enlarged plan, front, back, and end elevations of feeding arrangements.
Figs. 8, 9, and 10 are respectively a front and side elevation and plan of die-box.
Figs. 11 and 12, an elevation and plan of one of the dies.
Figure 7:
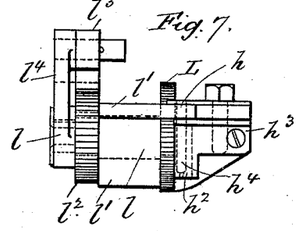
Figure 18:
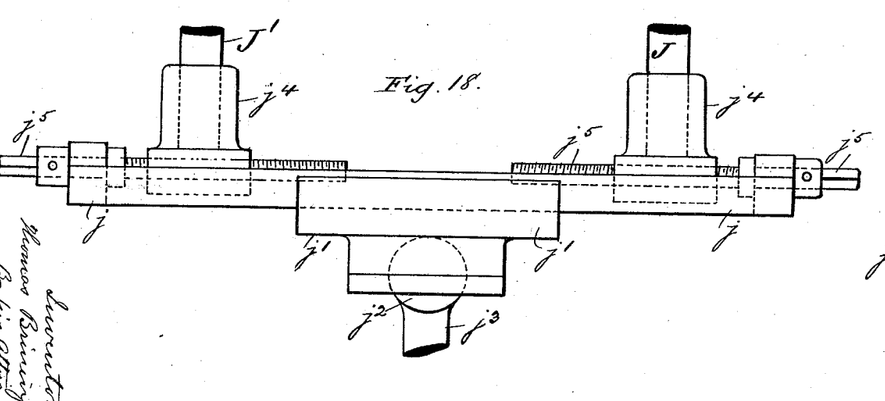
Figs. 18, 19, and 20 are respectively an enlarged front elevation, end elevation, and plan of last-supporting device.
Figure 19:
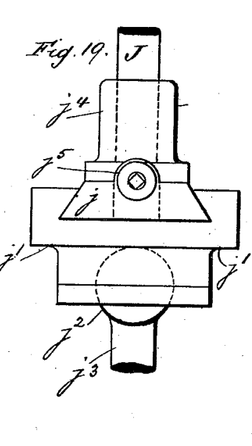
Figure 20:
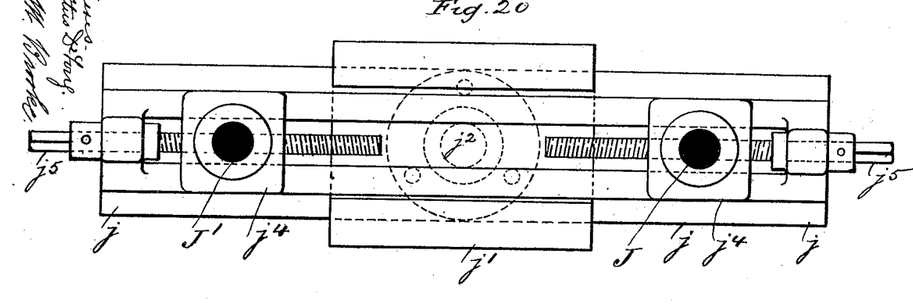

In order to insure a regular supply of rivets to the setting-tool, in the cover $f^7$ is cut a slit $f^{14}$, into which the curved end of a spring $g^8$ (fixed to a double-ended pivoted bar $g^9$) passes. One end or heel of the bar $g^9$ is kept in contact with an incline fixed to the fender E. As the jointed lever is moved inward the heel of the bar $g^9$ is forced up the incline, thereby depressing the opposite end, which causes the end of spring $g^8$ to pass into and along the slit $f^{14}$, so as to propel the rivets forward. The rivet, after passing into hole $f^9$, is carried forward by the slide G until it drops through a hole $h$ in the rivet-guide H. (See Figs. 4 and 5.) This guide is provided with a hole $h^5$ and a recess $h'$, in which are inserted two dies $h^3\ h^2$, which are held in position or face contact by means of the flat springs $h^3\ h^3$. In each of the dies is a vertical semicircular hole of two diameters, as shown at Fig. 11, the longer one of which is made at its lower end to taper into the smaller one. The upper portion $h^4$ of the hole is of such a diameter that the head of the rivet can pass readily through it, while the smaller diameter is just large enough to receive the shank, and which holds it in there until the fixing tool or ram descends to force open the dies and to drive in the rivets. The fixing-tool I is carried by a nipple $i$ in one end of the piston-rod $i'$, a portion of which works within a cylinder $i^2$, which is fixed to the projecting barrel $i^3$ of the fender E. This barrel also forms the lower bearings for the piston-rod. On the piston-rod, and within the cylinder, is a piston $i^4$, between which and the upper inner portion of the cylinder is fixed a spiral spring $i^5$, as shown at Fig. 3.

In order to impart the required pressure to the setting-tool I, a screw $i^6$ is passed into the top of the cylinder $i^2$, which is locked in position by a nut $i^7$. The screw $i^6$ also forms a bearing for the upper part of the piston-rod.

The stroke of the fixing-tool I is adjusted by means of the lock-nuts $i^5$, (shown at Fig. 3,) and to prevent any rebound of the rod when the fixing-tool has driven in the rivet a recess is provided in the top of the screw $i^6$, which is fitted with india-rubber or elastic packings $i^9$. An intermitting reciprocating motion is imparted to the fixing-tool by means of a cam D, mounted on the end of shaft A'. The cam raises the tool to its highest point, thereby compressing the spring $i^5$; but as soon as this has been reached the spring causes the tool to descend with such force that in falling it passes through the dies, and when it comes in contact with the taper part of the hole it forces them open sidewise, and in its further progress drives the rivet into the article operated upon. It will be observed that while the fixing-tool is doing this the rivet is guided and kept in a vertical position until the tool has reached its lowest point and completed its work. When the arrangement of guiding-tube $g^{18}$ is employed, the end of the fixing-tool I may be so arranged that its end when at the highest point will not pass out of the support carrying the die-box. The last containing the upper as it leaves the lasting-machine is mounted on a pillar J, so that its toe may rest upon the second pillar J'. These pillars are mounted in adjustable bearings upon a sliding framing $j'$, provided with the the universal joint $j^2$, by which it is connected to the supporting-rod $j^3$. The rod is passed through the bearing formed in the end of the bifurcated bracket $a^5$, and connected with its lowest end to the weighted treadle K, pivoted to the standard A at $k$.

In order to adjust the last to any desired position, the upper portion of the pillar J is pivoted to its lower portion and the two parts are kept in the desired position by means of the rack-segment $k'$, pawl $k^2$, and spring $k^3$. It will be readily seen that by the combined action of the universal joint and sliding table the boot can be manipulated in any desired direction under the setting-tool.

In order to feed or traverse the boot-sole the required distance or pitch of the rivets, a horizontal shaft $l$ is carried in suitable bearings on sole-plate $l'$, bolted to the under side of blocks $g'$. On this shaft is mounted, with one of its faces impinging against the dies $h^2$, a feed-wheel L, and on the opposite end is mounted a ratchet-wheel $l^2$, in which a pawl $l^3$ (carried on one arm of a bell-crank lever $l^4$) is made to work. To the other arm of the lever is attached the curved tappet rod or lever $l^5$, on the upper end of which the cam D operates. As the cam rotates it is made to strike the end of the tappet-rod, thereby depressing it, and the lever is pressed downward, carrying with it the pawl for rotating the wheel, thus traversing the last the required distance. The pawl can be set to take any number of teeth in the ratchet-wheel by means of a set-screw $l^8$, against which the pin $l^3$, carrying the pawl, is made to work. The higher the set-screw is raised the less will be the number of teeth taken at each movement, as the pin comes in contact with the screw sooner. The pawl is returned to its normal position by means of spiral spring $l^6$. The weighted treadle also keeps the sole of the boot constantly in contact with the feed-wheel during the whole of the riveting operation.

In order to regulate the distance of the rivets from the edge of the sole at the rear of the ratchet-wheel $l^2$, is fixed to the framing A a bracket M. To the under surface of the bracket is fixed by set-screws $m$ $m'$ a bifurcated slotted sliding plate N, armed at the end nearest the feed-wheel L with a runner $n$ and at the other end with an adjusting-screw $n'$, working in a nut $n^2$, fixed to the plate. To the bracket M is pivoted a cam $m^2$, against which the head $n^3$ is kept in contact by spring $n^3$. The edge of the sole is pressed against the face of the runner $n$, and its distance from the edge of the feed-wheel L is increased or diminished, according to which of the three faces of the cam $m^2$ is brought in contact with the head of screw $n'$. The position of the runner $n$ to feed-wheel L may be adjusted while the machine is in motion. The required rotary motion is imparted to the machine from any convenient source through friction-pulley B on shaft A'. In order to throw it out of gear at pleasure, the friction-clutch $b$ is connected to the lever $b'$, which is operated from the weighted treadle $b^2$ (pivoted to standard A at $b^3$) through connecting-rod $b^4$, lever $b^5$, and shaft $b^6$. When the treadle is depressed, the friction-clutch is brought in contact with the pulley, and thereby conveys motion to the moving parts of the machine; but as soon as the operator's foot is removed therefrom the clutch is by the weight on the treadle thrown out of gear with the pulley, and at same time a bracket $b^7$, fixed to lever $b^5$, is raised and made to pass within a recess $b^8$ in the periphery of a pulley, and thus stops its rotation.

The action of the machine is as follows: The boot after being lasted is placed, with its last, on the jack and adjusted to the required height and position under the die-box. Ordinary rivets—such as are obtained at grindery stores—having been placed in the oscillating boxes $f^2$ and fed to the dies in manner herein described, and the runner $n$ having been adjusted to the required distance, the machine is then set in motion by depressing the treadle $b^2$, which brings the clutch $b$ (by means of rod $b^4$ and bell-cranked lever $b^5$) into contact with pulley B, when the cams C and D, respectively, feed rivets to the slide G (and from thence to the dies H) and raise the driving-tool I to its highest position, when it is caused by the expansion of the springs to descend with sufficient force to open the dies H and drive the rivet into the sole. During the rotation of the cam D its perimeter comes in contact with the upper end of tappet-lever $l^5$, which, by means of crank-lever $l^4$, pawl $l^3$, and ratchet-wheel $l^2$, shaft $l$, and feed-wheel L, traverses the work forward the required distance between the rivets, which distance may be raised or adjusted by set-screws $l^8$. When the operator removes his foot from treadle $b^2$, the machine is speedily stopped by the arm $b^7$ passing into the groove or notch in the rim of pulley B.

In conclusion, I would have it understood that I am aware that prior to my invention pegging-machines having a fixing-tool raised and lowered by a cam-crank, eccentric, or its equivalent have been made; also, that rivets or nails have been fed down a single chute from an oscillating box, and are described in the specification of British Letters Patent granted to Thomas Cowburn the 23d day of April, 1879, No. 1,593, and to John Ellis Cutlan, dated May 19, 1884, No. 7,893. I therefore do not claim such combination, broadly; but What I do claim as my invention, and desire to secure by Letters Patent, is—

1. A boot or shoe riveting machine comprising a standard, a horizontal shaft carrying at one end a friction-clutch and at the other two cams, the setting-tool, a cylinder containing an adjustable spring and piston, the setting-tool, two oscillating boxes arranged one on each side of the setting-tool over fixed incline chutes, said chutes delivering the rivets into reciprocating slides, a spring die-box, a feed-wheel and tappet arrangement, and an adjustable jack for supporting the work during the riveting operation, but allowing it to be raised, lowered, or moved in any required direction, substantially as described.

2. In a boot or shoe riveting machine, the combination of framing A, shaft A', cam D, setting-tool I, nipple $i'$, cylinder $i^2$, barrel $i^3$, piston $i^4$, spring $i^5$, adjusting-screw $i^6$, nut $i^7$, lock-nuts $i^8$, india-rubber packing $i^9$, with a driving-pulley B keyed on said shaft, and friction-clutch $b$, substantially as herein described.

3. In a boot and shoe riveting machine, the combination of the setting-tool I and mechanism, substantially as herein described, for raising and imparting the required pressure to said tool for driving in the rivets, with the pulley B, having a notch in its rim, friction-clutch $b$, bifurcated lever $b'$, rod $b^4$, arm $b^7$, lever $b^5$, and weighted treadle $b^2$, pivoted to frame A, whereby the setting-tool may be brought into action and its motion arrested, substantially as described.

4. In a boot or shoe riveting machine, the combination of framing A, shaft A', setting-tool I, with the duplicate mechanism, substantially as described, for supplying rivets to said setting-tool, arranged one set on each side of the setting-tool, each consisting of an oscillating box, hopper, chute, slide G, and mechanism for actuating the same, substantially as specified.

5. In a boot or shoe riveting machine, the combination of oscillating box $f^2$, pivoted to arm F, hopper $f^3$, chute $f^4$, slide G, spring $g^6$, block $g'$, with spring-pins $f^{10}$ and $f^{11}$, and double-ended cam-lever $g^{10}$, pivoted to said block $g'$ and actuated by said slide G for allowing one rivet to pass at a time from said chute into the feed-slide, substantially as described.

6. In a boot or shoe riveting machine, the combination of framing A, brackets F, oscillating boxes $f^2$, pivoted to said brackets, rods $f^5$, hoppers $f^3$, inclined chute $f^4$, cover $f^7$, incline projection $f^{12}$, box $f^{13}$, spring-pins $f^{10}$ and $f^{11}$, double-ended cam-lever $g^{10}$, slide G, block $g'$, spring $g^6$, jointed levers $g^5$, shafts $g^4$, levers $g^3$, runners $g^2$, cam C, pin $g^{17}$, shaft A', driving-pulley B, friction-clutch $b$, and mechanism, substantially as specified, for throwing the friction-pulley in and out of gear, all as set forth.

7. In a boot or shoe riveting machine, the combination of the setting-tool I, and mechanism, substantially as specified, for actuating the same, oscillating boxes $f^2$, brackets F, rods $f^5$, hoppers $f^3$, inclined chutes $f^4$, covers $f^7$, spring-pins $f^{10}$ and $f^{11}$, and mechanism, as specified, for actuating said block $g'$, slides G, and mechanism, substantially as described, for reciprocating same, with fender E, inclines $e$, double-ended cam $g^9$, jointed lever $g^5$, spring $g^{20}$, pin $g^{21}$, and spring $g^8$, whereby the rivets are propelled forward, substantially as described.

8. In a boot or shoe riveting machine, the combination of the framing A, setting-tool I, mechanism, as specified, for actuating the same, slide G, and mechanism, substantially as described, for reciprocating same and for supplying the rivets thereto, die-box H, dies $h^2$, flat springs $h^3$, plate $i'$, pipes $g^{18}$, with feed-wheel L, shaft $l$, ratchet-wheel $l^2$, pawl $l^3$, bell-crank lever $l^4$, tappet-lever $l^5$, cam D, and mechanism, as described, for actuating the same, spring $l^6$, and adjusting-screw, as and for the purposes set forth.

9. In a boot or shoe riveting machine, the combination of the setting-tool I, and mechanism for operating same, as described, die-box H, dies $h^2$, feed-wheel L, and mechanism, as described, for operating same, with the runner $n$, plate N, adjusting-screw $n'$, nut $n^2$, bracket M, set-screws $m$ $m'$, cam-lever $m^2$, and spring $m^3$, as and for the purposes specified.

10. In a boot and shoe riveting machine, the combination of the setting-tool I, and mechanism, as described, for operating the same, slide G, and rivet-supplying mechanism, as specified, die-box H, dies $h^2$, feed-wheel L, and mechanism, as specified, for operating the same, plate N, armed with runner $n$, and mechanism, as described, for adjusting the same, with the means for supporting and presenting the work to the action of the setting-tool, comprising the adjustable pillars J J', slide $j$, block $j'$, ball-joint $j^2$, connecting-rod $j^3$, pivoted to lever K, bifurcated bearing $a^5$, weighted lever K, pivoted to framing A, rack K', pawl $K^2$, and spring $K^3$, as and for purposes set forth.

In testimony whereof I have hereunto set my hand to this specification, in the presence of the two subscribing witnesses, at Leeds, aforesaid, this 30th day of August, 1888.

THOMAS BRINING.

Witnesses:
  W. FAIRBURN HART,
  GEORGE LISTER.